(12) United States Patent
Hattori

(10) Patent No.: US 11,435,831 B2
(45) Date of Patent: *Sep. 6, 2022

(54) MEASUREMENT APPARATUS AND CONTROL METHOD OF MEASUREMENT APPARATUS

(71) Applicant: KYOCERA Corporation, Kyoto (JP)

(72) Inventor: Shigeto Hattori, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/057,412

(22) PCT Filed: May 9, 2019

(86) PCT No.: PCT/JP2019/018515
§ 371 (c)(1),
(2) Date: Nov. 20, 2020

(87) PCT Pub. No.: WO2019/225327
PCT Pub. Date: Nov. 28, 2019

(65) Prior Publication Data
US 2021/0208683 A1     Jul. 8, 2021

(30) Foreign Application Priority Data

May 22, 2018   (JP) .............................. JP2018-098165

(51) Int. Cl.
*G06F 3/01*     (2006.01)
*G01H 1/00*     (2006.01)
*G06F 3/041*    (2006.01)

(52) U.S. Cl.
CPC ............... *G06F 3/016* (2013.01); *G01H 1/00* (2013.01); *G06F 3/041* (2013.01); *G06F 2203/04105* (2013.01)

(58) Field of Classification Search
None
See application file for complete search history.

(56) References Cited

U.S. PATENT DOCUMENTS

| 9,841,839 | B2  |   | 12/2017 | Leigh et al. |   |
|---|---|---|---|---|---|
| 10,203,873 | B2 | * | 2/2019 | Marsden | G06F 3/0231 |
| 2015/0097803 | A1 | * | 4/2015 | Leigh | G06F 3/041 |
|  |  |  |  |  | 345/174 |
| 2016/0246369 | A1 | * | 8/2016 | Osman | A63F 13/212 |
| 2017/0127955 | A1 |   | 5/2017 | Sugita et al. |   |

FOREIGN PATENT DOCUMENTS

| JP | 2015-060543 A | 3/2015 |
|---|---|---|
| JP | 2016-030094 A | 3/2016 |
| JP | 2017-502535 A | 1/2017 |
| JP | 2017-134590 A | 8/2017 |

* cited by examiner

*Primary Examiner* — Krishna P Neupane
(74) *Attorney, Agent, or Firm* — Studebaker & Brackett PC

(57) ABSTRACT

A measurement apparatus measures an electronic device that vibrates a touch surface to present a tactile sensation. The measurement apparatus includes a pressing portion that applies pressure to a touch surface, a vibration detector that detects vibration of the touch surface, the vibration being produced in response to pressure applied to the touch surface, and a pressure detector that detects the pressure applied to the touch surface.

10 Claims, 5 Drawing Sheets

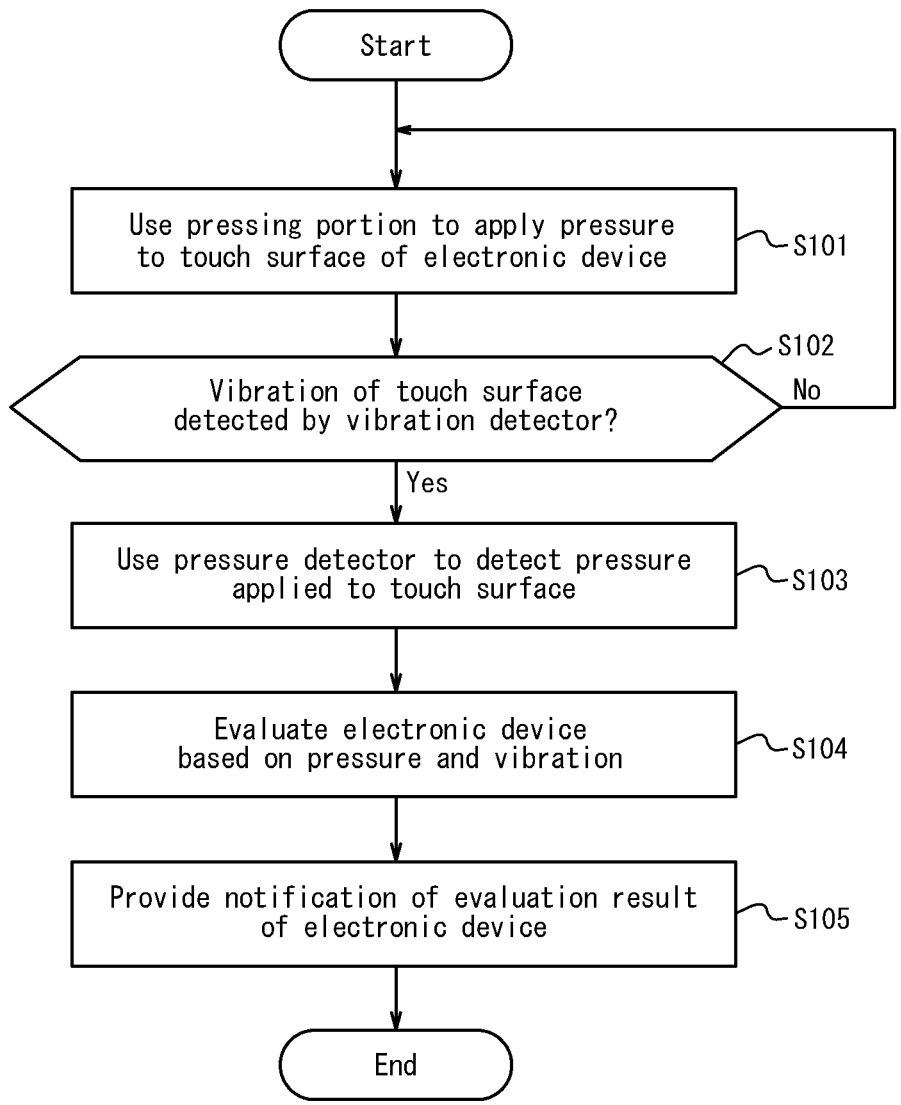

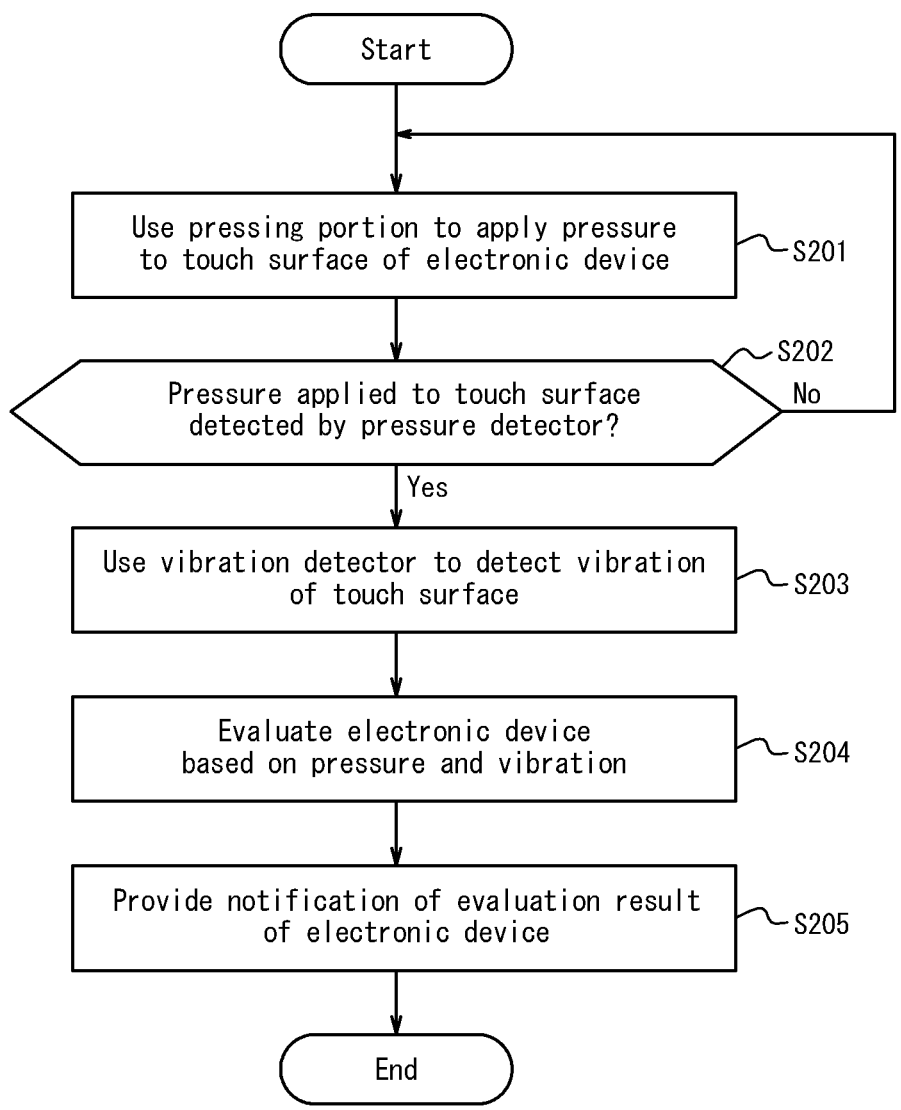

MEASUREMENT APPARATUS AND CONTROL METHOD OF MEASUREMENT APPARATUS

CROSS-REFERENCE TO RELATED APPLICATION

The present application claims priority to and the benefit of Japanese Patent Application No. 2018-098165 filed May 22, 2018, the entire contents of which are incorporated herein by reference.

TECHNICAL FIELD

The present disclosure relates to a measurement apparatus and a control method of a measurement apparatus.

Recently, electronic devices that present a tactile sensation to a user's fingertip or the like have been developed. For example, an electronic device is known that detects pressure due to a user operation on a touch panel and presents a tactile sensation to a user's fingertip or the like via the touch panel when the pressure satisfies a predetermined standard.

SUMMARY

A measurement apparatus according to an embodiment of the present disclosure measures an electronic device that vibrates a touch surface to present a tactile sensation. The measurement apparatus includes a pressing portion that applies pressure to a touch surface, a vibration detector that detects vibration of the touch surface, the vibration being produced in response to pressure applied to the touch surface, and a pressure detector that detects the pressure applied to the touch surface.

A control method according to an embodiment of the present disclosure is a control method of a measurement apparatus for measuring an electronic device that vibrates a touch surface to present a tactile sensation. The measurement apparatus includes a pressing portion, a vibration detector, and a pressure detector. The control method includes detecting, using a vibration detector, vibration of a touch surface, the vibration being produced in response to pressure applied to the touch surface. The control method includes detecting, using a pressure detector, the pressure applied to the touch surface.

BRIEF DESCRIPTION OF THE DRAWINGS

In the accompanying drawings:

FIG. 4 is a flowchart illustrating an example of processing executed by the measurement apparatus of FIG. 1; and FIG. 5 is a flowchart illustrating another example of processing executed by the measurement apparatus of FIG. 1.

DETAILED DESCRIPTION

A measurement apparatus that quantitatively measures the tactile sensation presented by an electronic device and a control method of the measurement apparatus are described below.

Figure 1:
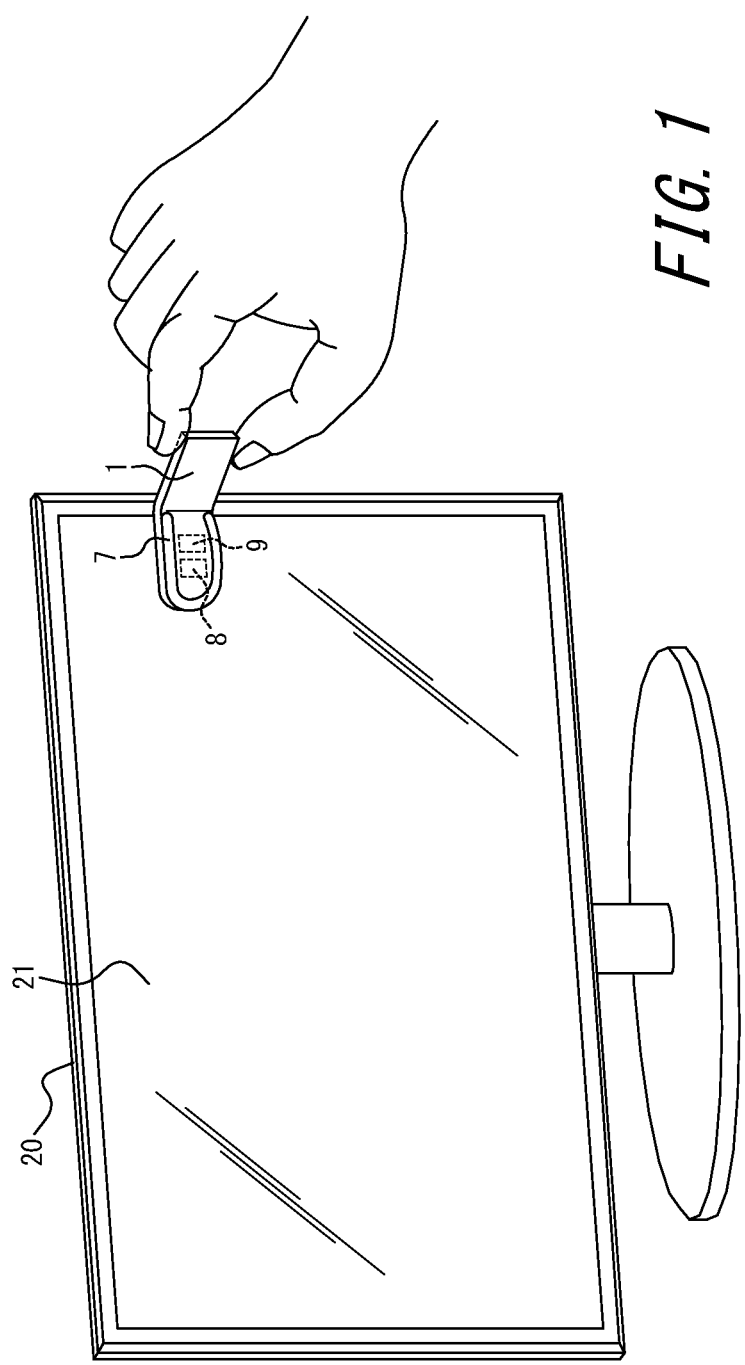
FIG. 1 schematically illustrates a measurement apparatus according to an embodiment of the present disclosure.

FIG. 1 schematically illustrates an example configuration of a measurement apparatus 1, according to an embodiment of the present disclosure, that measures a tactile sensation. The measurement apparatus 1 and an electronic device 20, which is the target of measurement, are illustrated in FIG. 1. For example, the measurement apparatus 1 includes a pressing portion 7, a vibration detector 8, and a pressure detector 9. The measurement apparatus 1 may be formed to have a shape and material fashioned after a human finger. The user presses the measurement apparatus 1 against a touch surface 21 of the electronic device 20 that is the target of measurement. While details are provided below, the measurement apparatus 1 is configured so that when the electronic device 20 is pressed by the pressing portion 7 and vibrates, the vibration of the electronic device 20 is detected by the vibration detector 8, and the pressure applied to the electronic device 20 is detected by the pressure detector 9. The measurement apparatus 1 can thereby quantitatively measure the tactile sensation presented by the electronic device. The measurement apparatus 1 is also referred to as the apparatus itself.

(Electronic Device Configuration)

The electronic device 20 that is the target of measurement by the measurement apparatus 1 according to an embodiment of the present disclosure includes a touch surface 21. The electronic device 20 vibrates the touch surface 21 in accordance with a user operation on the touch surface 21. The electronic device 20 can thereby present the tactile sensation to the user's finger or other body part, or to an instrument such as a touch pen, that is touching the touch surface 21. By obtaining a sense of operation through a tactile sensation on the fingertip or the like, the user can learn that input from the operation has been recognized by the apparatus. The touch surface 21 may be any component that includes a touch sensor, such as a touch panel or a touch switch. Various types of touch sensors may be used, such as a resistive film type, a capacitive type, and an optical type.

The tactile sensation presented by the electronic device 20 may include a sense of pressure, whereby the user senses a load in the bones and muscles as hardness or the like of the object when touching the object, and a sense of touch, whereby the user senses vibration on the skin surface as the feel or the like of the object when touching the object. The electronic device 20 can present the user with a tactile sensation by vibrating the touch surface 21 to stimulate the user's sense of pressure and sense of touch. For example, the tactile sensation of clicking a button may be included in the tactile sensation presented by the electronic device 20.

The electronic device 20 that presents such a tactile sensation may be any electronic device having the touch surface 21 that presents a tactile sensation. Examples of such electronic devices include a mobile phone terminal, a smartphone, a phablet, a tablet PC, a PDA, a remote control, a portable music player, and a game device. The electronic device 20 that presents a tactile sensation is not limited to such portable devices. Other examples of the electronic device 20 that presents a tactile sensation may include a desktop PC, a vending machine, a bank ATM, a ticket vending machine at a station, and other such electronic devices having the touch surface 21. Furthermore, examples of the electronic device 20 that presents a tactile sensation may include onboard devices in an automobile, such as a steering wheel, a car navigation system, a door lock button, and an onboard control panel embedded in the dashboard. Examples of the electronic device 20 that presents a tactile sensation are not limited to onboard devices and may include a wide variety of electronic devices, such as household appliances and industrial equipment.

(Configuration of Measurement Apparatus)

The schematic configuration of the measurement apparatus 1 as an example of a measurement apparatus according to an embodiment of the present disclosure is now described. The measurement apparatus 1 in FIG. 2 includes functional components such as a controller 2, a memory 3, a notification interface 4, an input interface 5, a communication interface 6, the pressing portion 7, the vibration detector 8, and the pressure detector 9.

While details are provided below, the controller 2 is one or more processors that provide control and processing capabilities for implementing the functions of the measurement apparatus 1. The controller 2 may be a processor, such as a central processing unit (CPU), that executes programs with prescribed control procedures or may be a dedicated processor specialized for the processing of each function.

The controller 2 is connected to each of the aforementioned functional components of the measurement apparatus 1 in a wired or wireless manner and controls and manages all or a portion of the measurement apparatus 1, starting with the functional components. The controller 2 acquires a program stored in the memory 3 and executes the program to implement various functions pertaining to each functional component of the measurement apparatus 1. The characteristic control performed by the controller 2 in the present embodiment is further described below.

The memory 3 includes, for example, a semiconductor memory, a magnetic memory, or an optical memory. The memory 3 may, for example, function as a main storage apparatus or an auxiliary storage apparatus. The memory 3 may also be a cache memory or the like of the processor included in the controller 2. The memory 3 may be a volatile storage apparatus or a non-volatile storage apparatus. The memory 3 stores information and programs used for control and processing to implement the functions of the measurement apparatus 1. The memory 3 may, for example, store a vibration detection condition for detecting vibration of the electronic device 20 that is the target of measurement, a pressure detection condition for detecting pressure applied to the electronic device 20, an evaluation condition for evaluating the presentation of a tactile sensation by the electronic device 20 that is the target of measurement, or the like, as described below.

The notification interface 4 provides notification of information by sound, vibration, light, images, and the like. The notification interface 4 includes at least one of a speaker, an oscillator, a light, a display device, and the like. The display device can, for example, be a liquid crystal display, an organic EL display, or the like. Based on control by the controller 2, the notification interface 4 may provide at least one form of notification such as a tactile sensation presented by the electronic device 20 that is the target of measurement, the pressure applied to the electronic device 20 when the electronic device 20 presents the tactile sensation, the result of evaluating the provision of a tactile sensation by the electronic device 20, and the like. For example, when the electronic device 20 that is the target of measurement is evaluated as not presenting a tactile sensation properly, the notification interface 4 may notify the user of an error by generating sound and turning on a light.

The input interface 5 can receive input operations from the user. The input interface 5 may, for example, include an input device such as a touch panel provided integrally with the display device of the notification interface 4, a keyboard, a mouse, a camera, a microphone, or the like. Upon detecting a user operation, the input interface 5 transmits the user operation to the controller 2 as electronic information. At least one of the notification interface 4 and the input interface 5 may, for example, be provided in a remote control, a tablet, a personal computer, a control apparatus, or the like physically separated from the measurement apparatus 1. For example, the input interface 5 may receive a user operation to start, end, or pause measurement by the measurement apparatus 1. The input interface 5 may receive a user operation to set the aforementioned vibration detection condition, pressure detection condition, evaluation condition, or the like. The controller 2 may control the measurement apparatus 1 based on user operations received by the input interface 5.

Based on control by the controller 2, the communication interface 6 communicates with another device communicably connected to the measurement apparatus 1 in a wired or wireless manner. The communication interface 6 may, for example, include a wired local area network (LAN) communication module or a wireless LAN communication module. The measurement apparatus 1 can, for example, receive a control signal for control of the measurement apparatus 1 from another device and operate based on the received control signal. The measurement apparatus 1 may also transmit a signal including the result of measurement of the electronic device 20, the result of evaluation, or the like to another device.

Figure 2:
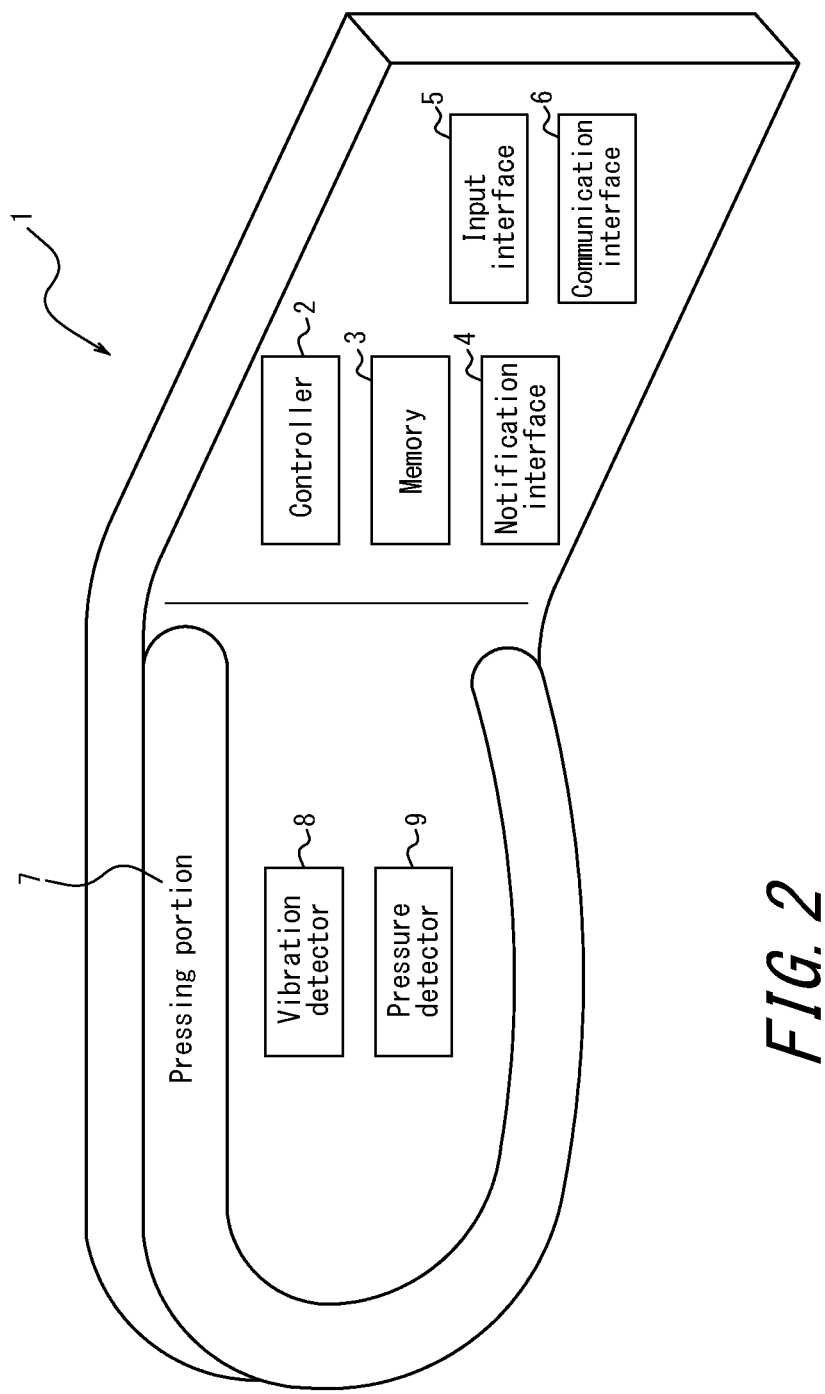
FIG. 2 schematically illustrates the configuration of the measurement apparatus of FIG. 1.

The pressing portion 7 applies pressure to the touch surface 21 of the electronic device 20 that is the target of measurement. The shape and material of the pressing portion 7 may be any shape and material corresponding to the application of the touch surface 21 of the electronic device 20 that is the target of measurement. For example, when the touch surface 21 of the electronic device 20 that is the target of measurement is operated by a human finger, a touch pen, or the like, the pressing portion 7 may be configured to have a shape and material that reproduces the pressure applied to the touch surface 21 by such objects. When the touch surface 21 of the electronic device 20 is operated by a human finger, the pressing portion 7 may be fashioned after a human finger and may be formed from a material that imitates a human finger by including a rubber material such as elastomer or silicone. A component such that at least one of the shape and the material is fashioned after a human finger is also referred to below as an artificial finger. The pressing portion 7 is disposed at any position enabling application of pressure to the touch surface 21 of the electronic device 20 that is the target of measurement. For example, the pressing portion 7 may be disposed to cover the outer surface of the measurement apparatus 1 that is fashioned after a human finger, as illustrated in FIG. 2. The pressing portion 7 can thereby apply pressure to the electronic device 20 when the user presses the measurement apparatus 1 against the touch surface 21.

The measurement apparatus 1 can apply pressure to the touch surface 21 of the electronic device 20 via the pressing portion 7 by any method corresponding to the conditions, set in the electronic device 20, for presentation of a tactile sensation. For example, the conditions, set in the electronic device 20, for presentation of a tactile sensation may be defined using items such as the magnitude, orientation, duration, and pattern of pressure to apply to the touch surface 21. Items included in the above-described pressure method may be combined for the pressing portion 7 to reproduce an operation by the user such as a tap, double tap, long tap, drag, swipe, flick, or pinch. In FIG. 2, the measurement apparatus 1 and the pressing portion 7 are fashioned after a human finger, but this example is not limiting. The measurement apparatus 1 and the pressing portion 7 may, for example, be fashioned after any part of the human body, including one or more fingers or one or more palms, in accordance with the conditions, set in the electronic device 20, for presentation of a tactile sensation.

The vibration detector 8 detects vibration produced in the touch surface 21 of the electronic device 20 that is the target of measurement. The vibration detector 8 may include a laser interference displacement meter or a laser Doppler vibrometer. In this case, the vibration detector 8 may be disposed at a position, such as the tip of the measurement apparatus 1, enabling irradiation of a laser onto the touch surface 21 of the electronic device 20. The vibration detector 8 can irradiate the touch surface 21 of the electronic device 20, which is the target of measurement, with a laser and receive reflected light to detect information related to vibration of the touch surface 21 in a non-contact manner. The information related to vibration may, for example, include at least one of the frequency, wavelength, waveform, amplitude, duration, and pattern of the vibration. The information related to vibration is also simply referred to as vibration. The vibration detector 8 may include a sensor such as a vibration sensor, gyro sensor, speed sensor, acceleration sensor, rotation angle sensor, or angular velocity sensor. In this case, the vibration detector 8 may be disposed at a position in the measurement apparatus 1 enabling detection of vibration produced in the touch surface 21 of the electronic device 20. The vibration detector 8 can detect vibration of the touch surface 21 based on the information detected by the sensor. The method by which the vibration detector 8 detects the vibration produced in the touch surface 21 and the arrangement position of the vibration detector 8 are not limited to the above examples and may be freely determined.

The pressure detector 9 detects pressure applied to the touch surface 21 of the electronic device 20 that is the target of measurement. The pressure detector 9 may include a pressure sensor. In this case, the pressure detector 9 may be installed at a position in the measurement apparatus 1 facing the touch surface 21 of the electronic device 20. The pressure detector 9 can detect information related to the pressure applied to the touch surface 21. The information related to pressure may, for example, include the magnitude, orientation, duration, and pattern of the pressure. The information related to pressure is also simply referred to as pressure. Various types of pressure sensors may be used, such as a resistive film type, a capacitive type, and an optical type. The method by which the pressure detector 9 detects the pressure applied to the touch surface 21 and the arrangement position of the pressure detector 9 are not limited to the above examples and may be freely determined.

The control performed by the controller 2 for the functions of the measurement apparatus 1 is described below. The controller 2 detects vibration of the touch surface 21 of the electronic device 20 using the vibration detector 8. The vibration detector 8 may detect vibration of the touch surface 21 of the electronic device 20 by using a sensor or the like, included in the vibration detector 8, to measure information related to vibration of the touch surface 21 of the electronic device 20, as described above. In this case, the controller 2 acquires the vibration of the touch surface 21 of the electronic device 20 measured by the vibration detector 8 from the vibration detector 8. The controller 2 may use a predetermined vibration detection condition to detect vibration of the touch surface 21 of the electronic device 20 with the vibration detector 8. The vibration detection condition may be set freely in accordance with conditions, set in the electronic device 20, for presenting the tactile sensation. The vibration detection condition may, for example, include conditions on the frequency, wavelength, waveform, amplitude, duration, and pattern of the vibration of the touch surface 21. In this case, the controller 2 may acquire information related to vibration of the touch surface 21 measured by the vibration detector 8 and judge whether the acquired information satisfies the vibration detection condition set in advance. When the information related to vibration of the touch surface 21 measured by the vibration detector 8 satisfies the vibration detection condition, the controller 2 may judge that the vibration detector 8 has detected vibration of the touch surface 21 of the electronic device 20.

The controller 2 uses the pressure detector 9 to detect the pressure applied to the touch surface 21 of the electronic device 20. The pressure detector 9 may detect pressure applied to the touch surface 21 of the electronic device 20 by using a sensor or the like, included in the pressure detector 9, to measure information related to pressure applied to the touch surface 21 of the electronic device 20, as described above. In this case, the controller 2 acquires the pressure applied to the touch surface 21 of the electronic device 20 measured by the pressure detector 9 from the pressure detector 9. The controller 2 may use a predetermined pressure detection condition to detect pressure applied to the touch surface 21 of the electronic device 20 with the pressure detector 9. The pressure detection condition may be set freely in accordance with conditions, set in the electronic device 20, for presenting the tactile sensation. For example, the pressure detection condition may include conditions such as the magnitude, orientation, duration, and pattern of pressure applied to the touch surface 21. In this case, the controller 2 may acquire information related to pressure applied to the touch surface 21 measured by the pressure detector 9 and judge whether the acquired information satisfies the pressure detection condition set in advance. When the information related to pressure applied to the touch surface 21 measured by the pressure detector 9 satisfies the pressure detection condition, the controller 2 may judge that the pressure detector 9 has detected pressure applied to the touch surface 21 of the electronic device 20.

The controller 2 evaluates the electronic device 20 based on the vibration detected by the vibration detector 8 and the pressure detected by the pressure detector 9. The controller 2 may use a predetermined evaluation condition to evaluate the electronic device 20 based on the detected vibration and pressure. The evaluation condition may be set freely in accordance with conditions, set in the electronic device 20, for presenting the tactile sensation. The predetermined evaluation condition may be a condition on the pressure at which the electronic device 20 vibrates the touch surface 21 to present a tactile sensation. The condition related to pressure may, for example, include the magnitude, orientation, duration, and pattern of the pressure. In this case, the controller 2 may evaluate the electronic device 20 based on the pressure detected by the pressure detector 9 when a predetermined vibration is detected by the vibration detector 8. For example, suppose that according to specifications, the electronic device 20 that is the target of measurement vibrates the touch surface 21 when a pressure of 1 N is applied to the touch surface 21. The controller 2 may use an evaluation condition stipulating that the magnitude of the pressure applied to the touch surface 21 when the electronic device 20 presents a tactile sensation be 1 N or greater. When the pressure applied by the pressing portion 7 to the touch surface 21 is increased incrementally, and a predetermined vibration is detected by the vibration detector 8, the controller 2 may evaluate the electronic device 20 as properly presenting a tactile sensation if the pressure detected by the pressure detector 9 is within a predetermined range of error from 1 N.

The predetermined evaluation condition may be a condition on the vibration produced by the electronic device 20 when pressure is applied to the touch surface 21. The condition related to vibration may include conditions on the frequency, wavelength, waveform, amplitude, duration, pattern, and the like of the vibration of the touch surface 21. In this case, the controller 2 may evaluate the electronic device 20 based on the vibration detected by the vibration detector 8 when a predetermined pressure is detected by the pressure detector 9. For example, suppose that according to specifications, the electronic device 20 produces a vibration with the waveform illustrated in FIG. 3 in the touch surface 21 when a pressure of 1 N or greater is applied to the touch surface 21. The controller 2 may use a condition related to the waveform of the vibration that the electronic device 20 produces in the touch surface 21 as the evaluation condition. When a pressure of 1 N or greater is applied from the pressing portion 7 to the touch surface 21, and a pressure of 1 N or greater is detected by the pressure detector 9, the controller 2 may compare information related to the waveform of the vibration detected by the vibration detector 8 and information related to the waveform of the vibration illustrated in FIG. 3. When the information related to the waveform of the detected vibration is within a predetermined range of error from the information related to the waveform of the vibration illustrated in the figure, the controller 2 may evaluate the electronic device 20 as properly presenting a tactile sensation.

During the above-described evaluation of the electronic device 20, the controller 2 may repeat detection of vibration by the vibration detector 8 and detection of pressure by the pressure detector 9 multiple times. The controller 2 may calculate the average, maximum value, minimum value, distribution, or the like of the plurality of vibrations and pressures detected by the vibration detector 8 and the pressure detector 9 and evaluate the electronic device 20 based on the calculated value.

The controller 2 may provide notification of the evaluation result of the electronic device 20 from the notification interface 4. The controller 2 may control the notification interface 4 to provide notification of at least one of the vibration of the electronic device 20 detected by the vibration detector 8, the pressure applied to the electronic device 20 and detected by the pressure detector 9, and the evaluation result of the presentation of a tactile sensation by the electronic device 20. For example, when the electronic device 20 that is the target of measurement is evaluated as not presenting a tactile sensation properly, the controller 2 may control the notification interface 4 to notify the user of an error by generating sound and turning on a light.

(First Operation Example of Measurement Apparatus)

An example of operations executed by the measurement apparatus 1 according to an embodiment of the present disclosure is described with reference to FIG. 1. The measurement apparatus 1 according to the first operation example can be used to test whether the electronic device 20 vibrates the touch surface 21 to present a tactile sensation when the pressure applied to the touch surface 21 reaches a predetermined pressure. For example, suppose that according to specifications, the electronic device 20 should not vibrate the touch surface 21 when a pressure of less than 1 N is applied to the touch surface 21 but should vibrate the touch surface 21 when a pressure of 1 N or greater is applied. In FIG. 1, the user is pressing the pressing portion 7 of the measurement apparatus 1 against the touch surface 21 of the electronic device 20. The measurement apparatus 1 uses the pressing portion 7 to apply pressure to the touch surface 21 of the electronic device 20 that is the target of measurement. When the pressure applied from the pressing portion 7 to the touch surface 21 is incrementally increased by the user from any value less than 1 N, the electronic device 20 vibrates the touch surface 21 at a certain point. When the vibration of the touch surface 21 is detected by the vibration detector 8, the measurement apparatus 1 uses the pressure detector 9 to detect the pressure applied to the touch surface 21. The measurement apparatus 1 judges that the electronic device 20 is properly presenting a tactile sensation when the magnitude of the pressure detected by the pressure detector 9 is within a predetermined range of error from 1 N. Conversely, the measurement apparatus 1 judges that the electronic device 20 is not properly presenting a tactile sensation when the magnitude of the pressure detected by the pressure detector 9 is outside a predetermined range of error from 1 N, or when pressure is not detected by the pressure detector 9. In accordance with the result of judgment, the measurement apparatus 1 notifies the user of the test result by outputting different sounds from the notification interface 4 for the cases of the electronic device 20 operating properly and not operating properly.

(First Processing Example of Measurement Apparatus)

An example of processing executed by the measurement apparatus 1, which is a measurement apparatus according to an embodiment of the present disclosure, is described with reference to FIG. 4. In the present processing example, the touch surface 21 of the electronic device 20 that is the target of measurement is described as being pressed by the user with the pressing portion 7 of the measurement apparatus 1.

Step S101: the measurement apparatus 1 applies pressure to the touch surface 21 of the electronic device 20 using the pressing portion 7.

Step S102: the controller 2 judges whether a predetermined vibration of the touch surface 21 is detected by the vibration detector 8. When a predetermined vibration is not detected by the vibration detector 8 (step S102: No), the processing of step S101 is continued.

Step S103: when a predetermined vibration is detected by the vibration detector 8 (step S102: Yes), the controller 2 uses the pressure detector 9 to detect the pressure applied to the touch surface 21.

Step S104: the controller 2 evaluates the electronic device 20 based on the pressure detected by the pressure detector 9 and the vibration detected by the vibration detector 8. Specifically, the controller 2 evaluates the electronic device 20 based on the pressure detected by the pressure detector 9 when a predetermined vibration is detected by the vibration detector 8.

Step S105: the controller 2 provides notification of the evaluation result of the electronic device 20 from the notification interface 4.

(Second Operation Example of Measurement Apparatus)

Figure 3:
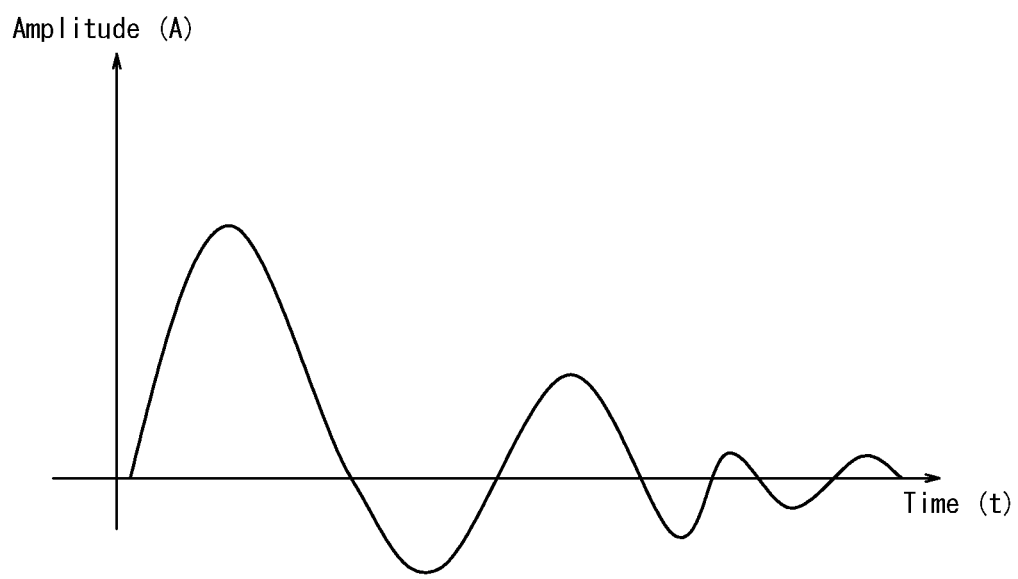
FIG. 3 is a graph illustrating an example of vibration produced by an electronic device that is the target of measurement by the measurement apparatus of FIG. 1.

An example of operations executed by the measurement apparatus 1 according to an embodiment of the present disclosure is described with reference to FIGS. 1 and 3. The measurement apparatus 1 according to the second operation example can be used to test whether the electronic device 20 produces a predetermined vibration in the touch surface 21 to present a tactile sensation properly when pressure is applied to the touch surface 21. For example, suppose that according to specifications, the electronic device 20 produces a vibration with the waveform illustrated in FIG. 3 in the touch surface 21 when a pressure of 1 N or greater is applied to the touch surface 21. An evaluation condition that uses the maximum amplitude, duration, repeated pattern, and the like to define the waveform of the vibration illustrated in FIG. 3 is stored in the memory 3 of the measurement apparatus 1. In FIG. 1, the user is pressing the pressing portion 7 of the measurement apparatus 1 against the touch surface 21 of the electronic device 20. A pressure of 1 N or greater is applied from the pressing portion 7 to the touch surface 21 by the user. When the pressure applied to the touch surface 21 is detected by the pressure detector 9, the measurement apparatus 1 uses the vibration detector 8 to detect vibration produced in the touch surface 21. The measurement apparatus 1 judges that the electronic device 20 is properly presenting a tactile sensation when the waveform of the vibration detected by the vibration detector 8 is within a predetermined range of error from the waveform illustrated in FIG. 3. Conversely, the measurement apparatus 1 judges that the electronic device 20 is not properly presenting a tactile sensation when the waveform of the vibration detected by the vibration detector 8 is outside a predetermined range of error from the evaluation condition, or when the waveform of the vibration is not detected by the vibration detector 8. In accordance with the result of judgment, the measurement apparatus 1 notifies the user of the test result by outputting different sounds from the notification interface 4 for the cases of the electronic device 20 operating properly and not operating properly.

(Second Processing Example of Measurement Apparatus)

An example of processing executed by the measurement apparatus 1, which is a measurement apparatus according to an embodiment of the present disclosure, is described with reference to FIG. 5. In the present processing example, the touch surface 21 of the electronic device 20 that is the target of measurement is described as being pressed by the user with the pressing portion 7 of the measurement apparatus 1.

Step S201: the measurement apparatus 1 applies pressure to the touch surface 21 of the electronic device 20 using the pressing portion 7.

Step S202: the controller 2 judges whether a predetermined pressure of the touch surface 21 is detected by the pressure detector 9. When a predetermined pressure is not detected by the pressure detector 9 (step S202: No), the processing of step S201 is continued.

Step S203: when a predetermined pressure is detected by the pressure detector 9 (step S202: Yes), the controller 2 uses the vibration detector 8 to detect vibration produced in the touch surface 21.

Step S204: the controller 2 evaluates the electronic device 20 based on the pressure detected by the pressure detector 9 and the vibration detected by the vibration detector 8. Specifically, the controller 2 evaluates the electronic device 20 based on the vibration detected by the vibration detector 8 when a predetermined pressure is detected by the pressure detector 9.

Step S205: the controller 2 provides notification of the evaluation result of the electronic device 20 from the notification interface 4.

As described above, the measurement apparatus 1 according to the present embodiment measures the electronic device 20 that vibrates the touch surface 21 to present a tactile sensation. The measurement apparatus includes the pressing portion 7 that applies pressure to the touch surface 21, the vibration detector 8 that detects vibration of the touch surface 21, the vibration being produced in response to pressure applied to the touch surface 21, and the pressure detector 9 that detects the pressure applied to the touch surface 21. The measurement apparatus 1 configured in this way can quantitatively measure the tactile sensation presented by the electronic device 20. The measurement apparatus 1 can thereby quantitatively make the judgment of whether the tactile sensation presented by the electronic device 20 is the desired tactile sensation, or whether a plurality of electronic devices 20 present the same tactile sensation. Accordingly, this technique for measuring the tactile sensation presented by the electronic device 20 is more useful.

At least one of the shape and/or the material of the pressing portion 7 of the measurement apparatus 1 according to the present embodiment is fashioned after a human finger. When the electronic device 20 that is the target of measurement includes the touch surface 21 operated by a human finger, the above configuration enables reproduction of a touch on the touch surface 21 of the electronic device 20 by a user's finger when the pressing portion 7 applies pressure to the touch surface 21. This technique for measuring the tactile sensation presented by the electronic device 20 is thereby more useful.

The measurement apparatus 1 according to the present embodiment further includes the controller 2. The controller 2 evaluates the electronic device 20 based on the vibration detected by the vibration detector 8 and the pressure detected by the pressure detector 9. The measurement apparatus 1 configured in this way can use the vibration of the touch surface 21 and the pressure applied to the touch surface 21 for a multifaceted evaluation of the tactile sensation presented when the electronic device 20 that is the target of measurement vibrates the touch surface 21. This technique for measuring the tactile sensation presented by the electronic device 20 is thereby more useful.

The controller 2 of the measurement apparatus 1 according to the present embodiment evaluates the electronic device 20 based on the pressure detected by the pressure detector 9 when a predetermined vibration is detected by the vibration detector 8. The measurement apparatus 1 configured in this way can evaluate, based on the pressure applied to the touch surface 21, whether the electronic device 20 that presents a tactile sensation is presenting the tactile sensation properly. This technique for measuring the tactile sensation presented by the electronic device 20 is thereby more useful.

The controller 2 of the measurement apparatus 1 according to the present embodiment evaluates the electronic device 20 based on the vibration detected by the vibration detector 8 when a predetermined pressure is detected by the pressure detector 9. The measurement apparatus 1 configured in this way can evaluate, based on the vibration produced in the touch surface 21, whether the electronic device 20 that presents a tactile sensation is presenting the tactile sensation properly. This technique for measuring the tactile sensation presented by the electronic device 20 is thereby more useful.

The vibration detector 8 of the measurement apparatus 1 according to the present embodiment detects at least one of the frequency, wavelength, waveform, amplitude, duration, and/or pattern of the vibration of the touch surface 21. The measurement apparatus 1 configured in this way can quantitatively define the vibration to be produced in the touch surface 21 by the electronic device 20 that presents a tactile sensation. This technique for measuring the tactile sensation presented by the electronic device 20 is thereby more useful.

The measurement apparatus 1 according to the present embodiment further includes the notification interface 4 that provides notification of the evaluation result of the electronic device 20. The measurement apparatus 1 configured in this way can inform the user of the measurement apparatus 1 of whether the electronic device 20 that is the target of measurement is properly presenting a tactile sensation. This technique for measuring the tactile sensation presented by the electronic device 20 is thereby more useful.

The above embodiments have been described as representative examples, but it will be apparent to one of ordinary skill in the art that numerous modifications and replacements may be made within the spirit and scope of the present disclosure. Therefore, the present disclosure should not be interpreted as being restricted to the above embodiments. A variety of changes or modifications may be made without departing from the scope of the appended claims. For example, the functions and the like included in the various units and steps may be reordered in any logically consistent way. Furthermore, a plurality of units and steps may be combined into one, or a single unit or step may be divided.

For example, the measurement apparatus 1 has been described as including both the vibration detector 8 and the pressure detector 9 in the above embodiment, but this example is not limiting. One of the vibration detector 8 and the pressure detector 9 may be separate from the measurement apparatus 1. The vibration detector 8 or pressure detector 9 that is separate may be communicably connected to the measurement apparatus 1 in a wired or wireless manner. For example, when the vibration detector 8 is separate from the measurement apparatus 1, the vibration detector 8 may be disposed at a position enabling detection, at the time of measurement of the electronic device 20 by the measurement apparatus 1, of vibration produced in the touch surface 21 of the electronic device 20 that is the target of measurement. When the pressure detector 9 is separate from the measurement apparatus 1, the pressure detector 9 may be disposed at a position enabling detection, at the time of measurement of the electronic device 20 by the measurement apparatus 1, of pressure applied to the touch surface 21 of the electronic device 20 that is the target of measurement. The measurement apparatus 1 may receive information related to the vibration measured by the vibration detector 8 or the pressure measured by the pressure detector 9 and perform the above-described measurement and evaluation of the electronic device 20 that is the target of measurement. By providing the vibration detector 8 or the pressure detector 9 separately from the measurement apparatus 1, this configuration can reduce the effect on the vibration detector 8 or the pressure detector 9 produced when the user presses the measurement apparatus 1 against the touch surface 21 of the electronic device 20 that is the target of measurement. This technique for measuring the tactile sensation presented by the electronic device 20 is thereby more useful.

The target of measurement by the measurement apparatus 1 has been described in the above embodiment as being the electronic device 20 that vibrates the touch surface 21 to present a tactile sensation, but this example is not limiting. The electronic device 20 that is the target of measurement by the measurement apparatus 1 may present a tactile sensation by any method. In this case, the measurement apparatus 1 includes a detector that detects the tactile sensation presented by the electronic device 20 that is the target of measurement. For example, the target of measurement by the measurement apparatus 1 may be an electronic device 20 that cools or heats the touch surface 21 to present a tactile sensation. In this case, the measurement apparatus 1 may include a temperature detector that detects the temperature of the touch surface produced in response to pressure being applied to the touch surface 21. This technique for measuring the tactile sensation presented by the electronic device 20 is thereby more useful.

The invention claimed is:

1. A measurement apparatus for measuring an electronic device that vibrates a touch surface to present a tactile sensation, the measurement apparatus comprising:
    a pressing portion configured to apply pressure to the touch surface;
    a vibration detector configured to detect vibration of the touch surface, the vibration being produced in response to pressure applied to the touch surface; and
    a pressure detector configured to detect the pressure applied to the touch surface,
    wherein the measurement apparatus is configured to be pressed against the touch surface by a user.

2. The measurement apparatus of claim 1, wherein at least one of a shape and/or a material of the pressing portion is fashioned after a human finger.

3. The measurement apparatus of claim 1, further comprising:
    a controller;
    wherein the controller is configured to evaluate an electronic device based on the vibration and the pressure that are detected.

4. The measurement apparatus of claim 3, wherein the controller is configured to evaluate the electronic device based on pressure detected by the pressure detector when a predetermined vibration is detected by the vibration detector.

5. The measurement apparatus of claim 3, wherein the controller is configured to evaluate the electronic device based on vibration detected by the vibration detector when a predetermined pressure is detected by the pressure detector.

6. The measurement apparatus of claim 3, further comprising a notification interface configured to provide notification of a result of evaluation of the electronic device.

7. The measurement apparatus of claim 1, wherein the vibration detector is configured to detect at least one of a frequency, a wavelength, a waveform, an amplitude, a duration, and/or a pattern of the vibration of the touch surface.

8. A control method of a measurement apparatus for measuring an electronic device that vibrates a touch surface to present a tactile sensation, the measurement apparatus comprising a pressing portion, a vibration detector, and a pressure detector, the control method comprising:
    detecting, using the vibration detector, vibration of the touch surface, the vibration being produced in response to pressure applied to the touch surface; and
    detecting, using the pressure detector, the pressure applied to the touch surface,
    wherein the measurement apparatus is configured to be pressed against the touch surface by a user.

9. The measurement apparatus of claim 1, wherein the pressing portion is disposed to cover an outer surface of the measurement apparatus.

10. The control method of claim 8, wherein the pressing portion is disposed to cover an outer surface of the measurement apparatus.

* * * * *